Figure 1:
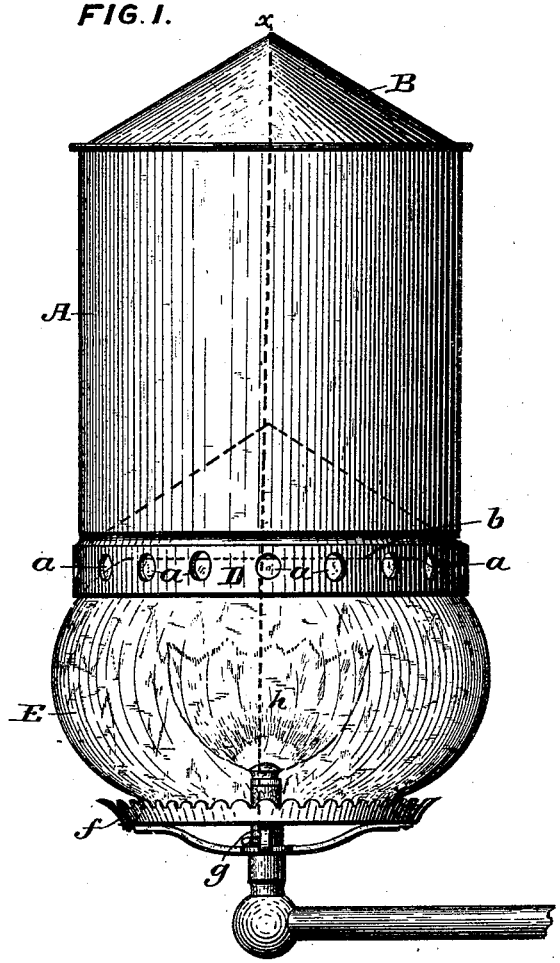

(No Model.) 2 Sheets—Sheet 1.
O. H. P. CORNELL.
COMBINED GAS HEATING AND LIGHTING DEVICE.

No. 481,139. Patented Aug. 16, 1892.

ATTEST.
J. Henry Kaiser
Ben. Munroe

INVENTOR.
Oliver H. P. Cornell,
By M. D. Converse,
His Attorney (No Model.) 2 Sheets—Sheet 2.
O. H. P. CORNELL.
COMBINED GAS HEATING AND LIGHTING DEVICE.
No. 481,139. Patented Aug. 16, 1892.
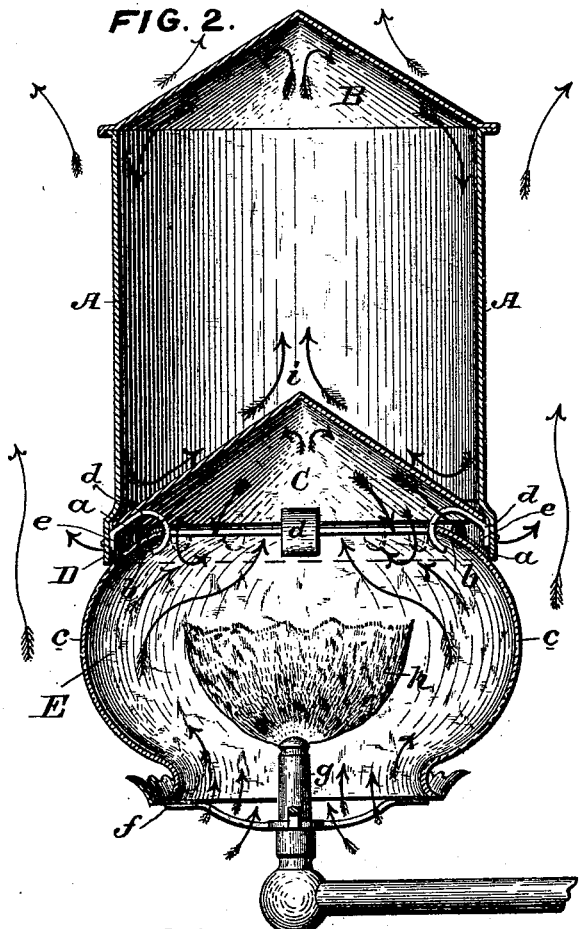
FIG. 2.
FIG. 3.
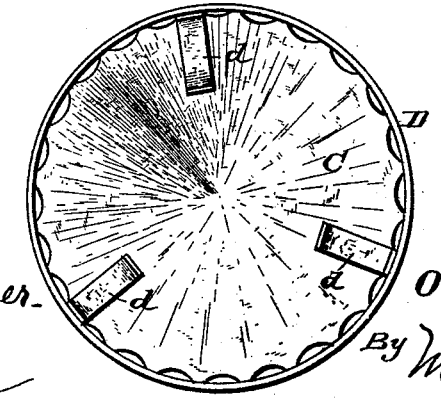
ATTEST.
J. Henry Kaiser
Ben. Munro
INVENTOR.
Oliver H. P. Cornell.
By M. D. Converse,
his Attorneys

UNITED STATES PATENT OFFICE.

OLIVER H. P. CORNELL, OF ALBANY, ASSIGNOR, BY MESNE ASSIGNMENTS, TO THE CALORIC CONE COMPANY, OF NEW YORK, N. Y.

COMBINED GAS HEATING AND LIGHTING DEVICE.

SPECIFICATION forming part of Letters Patent No. 481,139, dated August 16, 1892.

Application filed December 20, 1890. Serial No. 375,362. (No model.)

*To all whom it may concern:*

Be it known that I, OLIVER H. P. CORNELL, a citizen of the United States, residing in the city and county of Albany, in the State of New York, have invented new and useful Improvements in a Combined Gas Heating and Lighting Device, of which the following is a specification, My invention relates to that class wherein the heating capacity of the flame from gas-tips employed for lighting purposes is materially augmented, thereby performing the further service of warming the atmosphere of a room and without detracting from its lighting capacity.

The objects of my invention are to improve the combustion and thus increase the heating-power, to insure such a circulation of the atmosphere of the room as will readily and effectually destroy impurities in the same, and to maintain a uniform steady heat and communicate the same to the external atmosphere of a room through novel combinations of conducting and radiating mediums and arrangement or relationship of forms and devices.

My invention consists, mainly, in the employment of a confined body of atmospheric air within a chamber or drum of suitable radiating material, and in constructing the latter of such form and parts that, in combination with a gas-lighting jet and globe of proper shape and proportions, there will be induced the peculiar action of currents of air and gas most favorable to perfect combustion, uniformity of heat, intensity of light, rapid circulation, and consequent purity of the atmosphere, and in other features or devices, all of which are hereinafter fully described.

Referring to the drawings, Figure 1 is a side elevation of my invention complete. Fig. 2 is a vertical sectional view of the same on the line $xx$, showing the several elements, construction, and manner of assembling the same with the relation of the several parts to each other and the effects of their operation; and Fig. 3 represents a modification of part of my invention, all of which are respectively referred to in detail below.

Like letters indicate corresponding parts throughout the several figures.

A represents the cylindrical sides of a drum or air-chamber; B, the well-fitted closed upper end, and C the conical or upwardly-depressed bottom of the same with apex $i$; D, the lower edge or rim of the drum sides A, extending below the periphery of the cone-shaped bottom C.

$a\ a$ are lateral perforations in the extended rim D.

E is a hollow globe of glass or other light-emitting substance, and $b$ the inwardly-curved upper rim of the same, upon the inclined outer surface of which the rim D of the drum rests all around at a point between its extreme upper edge and the greatest diameter $c$ of the globe. (Clearly seen in Fig. 2.)

In Fig. 3 at the periphery of the conical bottom C, I have shown a modification consisting in cutting away slight portions of the edge for small air-passages.

$d\ d$ in Figs. 2 and 3 are strips of thin flexible metal riveted to the rim of the drum at $e$, which when the latter is placed in position on the globe E are bent around under the upper inwardly-curved edges of the same, as seen in Fig. 2, to hold the drum in position.

$f$ is a globe-bracket, $g$ a gas-tip, and $h$ a flame from the latter.

The operation of my invention is as follows: The drum, having the several parts with the respective forms shown or their equivalents, having been mounted and secured to a globe so that the upper edge $b$ of the globe is raised above or about on a level with the upper edges of the openings $a\ a$, as seen in Figs. 1 and 2, and in all other respects having the parts and forms shown or their equivalents necessary to establish the relationship shown between the drum, its parts, and the globe and its parts. The whole is now placed in position upon the globe-bracket $f$, attached to a gas-tip $g$, bringing the flame $h$ from the latter directly under the apex $i$ of the conical bottom of the drum. The draft incident to the heat of the flame sucks the atmosphere from the room up through the throat or bottom of the globe, carrying the products of combustion with any particles of carbon or other combustible material not immediately consumed up into the apex *i*, which, being tightly closed, prevents their escape till consumed. Here the current divides and flows off radially down along the under surface of this conical bottom, heating it, and through it heating the air in the drum, till it reaches a point nearly on a level with the upper edge of the globe, where all the products of true combustion, being the lighter, continue to descend, hugging this surface, and finally pass out through the lateral openings *a a* to a contact with external air, and by raising the temperature of the latter carries it upward in contact with or adjacent to the exterior sides of the drum, whereby its heat is maintained by radiation and circulated through the room, while the heavier unconsumed portions, if there be any, having gravitated toward the throat of the globe and fallen within the plane of the upper edge *b* of the same, fail to escape and are here met and caught up by an upwardly-tending current, which, having been heated and expanded within the globe, is forced in an upward and converging column induced by the inwardly-curved edge *b* of the same, thus being returned to be further or completely burned at the apex *i* and to transmit the resultant heat through the conical bottom to the volume of air in the drum, and thence through the sides and top of the drum to the external air of the room by radiation. Confinement of a suitable volume of air in a drum or chamber of substantially the form and to be heated as shown further acts by internal local circulation (caused, also, by the great heat of the apex *i*) to prevent overheating of the metal, since thus confined the air as it becomes hot traveling upward in the center, then outward and downward along the internal sides of the drum, as shown by the arrows, parts with its heat in the latter movement, so that on returning along, upward, and over the inside of the conical bottom it serves to reduce the temperature of the latter by absorption.

I construct the drum with fairly well-made joints and seams throughout, but with sufficient allowance for inward and outward passage of air during expansion and contraction to prevent its warping out of shape.

The modification shown in Fig. 3 is one means of relief for expansion of the confined air.

I do not confine myself to the particular form of drum shown, except as to the use of a conical or upwardly-depressed bottom and the requirements necessary for a proper confinement of the air-volume, nor to the particular form of rim on the lower edge of the drum or to the particular form of globe, except as to the requirements necessary in the two when combined, which shall bear the relationship to each other that is established by the position of the former as it rests on the latter and the inwardly-curved edge *b* of the same, as shown, whereby in practice the movements of air and gaseous currents shown are induced.

The heating power of a device constructed and applied as shown and described is not only very great, but the illuminating capacity of the flame by its use is augmented, while deleterious, poisonous, or noxious gases or vapors are eliminated from the atmosphere of any room lighted and heated by it. The device is also economical of cost.

I am aware of Patent No. 245,714, dated August 16, 1881, wherein a cover having a downwardly-depressed center with perforated edges is placed over a gas-globe; also, of Patent No. 426,215, dated April 22, 1890, wherein a globe with a closed top and open bottom is joined to the open top of a second or lower globe, surmounting a gas-jet, with lateral openings between them; but in both those devices the gas, air, and products of combustion are free to ascend and descend throughout their combined interior length, since there is no dividing-wall or partition between them and consequently no closed drum for confining a volume of air.

I am also aware of Patent No. 75,516, dated March 17, 1868, wherein products of incomplete combustion, &c., are collected and condensed or neutralized by discharge into a separate vessel, but are not consumed by the heat of the device, and wherein, also, the drum does not confine the air, but is an open one taking a supply at the bottom and heating and discharging it at or near the top.

I am likewise aware of Patent No. 360,497, where, also, an open or perforated drum is employed.

Having described my invention, what I claim as new, and desire to secure by Letters Patent, is—

1. In a combined heating and lighting device, the combination, with a globe, of a closed drum containing a volume of atmospheric air and having an upwardly-depressed conical bottom and means for supporting the same centrally, so as to extend laterally all around beyond the upper edge of the globe and leave a radially-inclined space between them, substantially as and for the purposes shown and described.

2. In a combined heating and lighting device, the combination, with a closed drum containing a volume of atmospheric air, of a globe having an inwardly-curved upper edge and means of supporting the former, so that the periphery of its lower end will extend beyond and overhang the sloping outer surface of the latter and leave a space between them, substantially as and for the purposes shown and described.

3. In a combined heating and lighting device, the combination, with a hollow globe, of a closed drum containing atmospheric air, having an upwardly-depressed or conical bottom with its apex above and its periphery about on or slightly below the level of the upper edge of the globe, the former so located above the latter as to leave a space between them, substantially as and for the purposes shown and described.

4. In a combined heating and lighting device, the combination of a hollow globe, with a drum or chamber above provided with the herein-described conical or upwardly-depressed bottom, substantially as and for the purposes shown and described.

5. In a combined heating and lighting device, the herein-described combustion-chamber, consisting of the inwardly-curved upper edge of a hollow globe, an apex of the conical or upwardly-depressed bottom of a closed drum arranged to leave a radially-sloping space between the said conical bottom near its periphery and the said upper edge of the globe, in combination with a closed drum and a globe, and to operate substantially as and for the purposes shown and described.

6. As a new article of manufacture, the herein-described device, consisting of a drum with cylindrical sides A, closed upper end B, conical bottom C, with inwardly-depressed apex $i$, flexible metallic strips $d$, downwardly-extending rim D, and perforations $a$, the whole constructed and to operate substantially as and for the purposes shown and described.

OLIVER H. P. CORNELL.

Witnesses:
EMMA M. GILLETT,
S. F. RANDOLPH.